United States Patent
Agness et al.

(10) Patent No.: US 8,970,977 B1
(45) Date of Patent: Mar. 3, 2015

(54) DISK DRIVE LOGGING FAILURE ANALYSIS DATA WHEN PERFORMING AN EMERGENCY UNLOAD

(71) Applicant: Western Digital Technologies, Inc., Irvine, CA (US)

(72) Inventors: John R. Agness, Laguna Hills, CA (US); Mingying Gu, Alisio Viejo, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 187 days.

(21) Appl. No.: 13/631,588

(22) Filed: Sep. 28, 2012

(51) Int. Cl.
*G11B 5/54* (2006.01)
*G11B 19/28* (2006.01)

(52) U.S. Cl.
CPC . *G11B 5/54* (2013.01); *G11B 19/28* (2013.01)
USPC .................. 360/55; 360/69; 360/75

(58) Field of Classification Search
None
See application file for complete search history.

(56) References Cited

U.S. PATENT DOCUMENTS

| | | | |
|---|---|---|---|
| 5,384,524 A | 1/1995 | Romano | |
| 5,557,183 A | 9/1996 | Bates et al. | |
| 6,249,887 B1 | 6/2001 | Gray et al. | |
| 6,415,189 B1 * | 7/2002 | Hajji | 700/79 |
| 6,934,879 B2 | 8/2005 | Misra et al. | |
| 6,967,804 B1 | 11/2005 | Codilian | |
| 7,420,762 B2 * | 9/2008 | Abe et al. | 360/75 |
| 7,707,461 B2 | 4/2010 | Dougherty et al. | |
| 7,765,437 B2 * | 7/2010 | Gittins et al. | 714/47.2 |
| 7,944,642 B2 * | 5/2011 | Jeansonne et al. | 360/75 |
| 8,085,488 B2 * | 12/2011 | Feliss et al. | 360/69 |
| 8,134,795 B2 * | 3/2012 | Feliss et al. | 360/69 |
| 8,195,444 B2 * | 6/2012 | Brunet et al. | 703/24 |
| 2002/0036850 A1 * | 3/2002 | Lenny et al. | 360/31 |
| 2006/0130316 A1 | 6/2006 | Takase et al. | |
| 2006/0156024 A1 * | 7/2006 | Zayas et al. | 713/182 |
| 2008/0180830 A1 * | 7/2008 | Miyamoto | 360/69 |
| 2010/0062833 A1 * | 3/2010 | Mattice et al. | 463/24 |

OTHER PUBLICATIONS

S.M.A.R.T., Wikipedia, http://en.wikipedia.org/wiki/S.M.A.R.T.

* cited by examiner

*Primary Examiner* — Wayne Young
*Assistant Examiner* — James L Habermehl

(57) ABSTRACT

A disk drive is disclosed comprising a head actuated over a disk, a spindle motor operable to rotate the disk, and a ramp near an outer periphery of the disk. When an emergency condition is detected, the head is unloaded onto the ramp, and failure analysis data identifying a cause of the emergency condition is logged.

14 Claims, 2 Drawing Sheets

US 8,970,977 B1

DISK DRIVE LOGGING FAILURE ANALYSIS DATA WHEN PERFORMING AN EMERGENCY UNLOAD

BACKGROUND

Disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and embedded servo sectors. The embedded servo sectors comprise head positioning information (e.g., a track address) which is read by the head and processed by a servo control system to control the actuator arm as it seeks from track to track.

DETAILED DESCRIPTION

Figure 1:
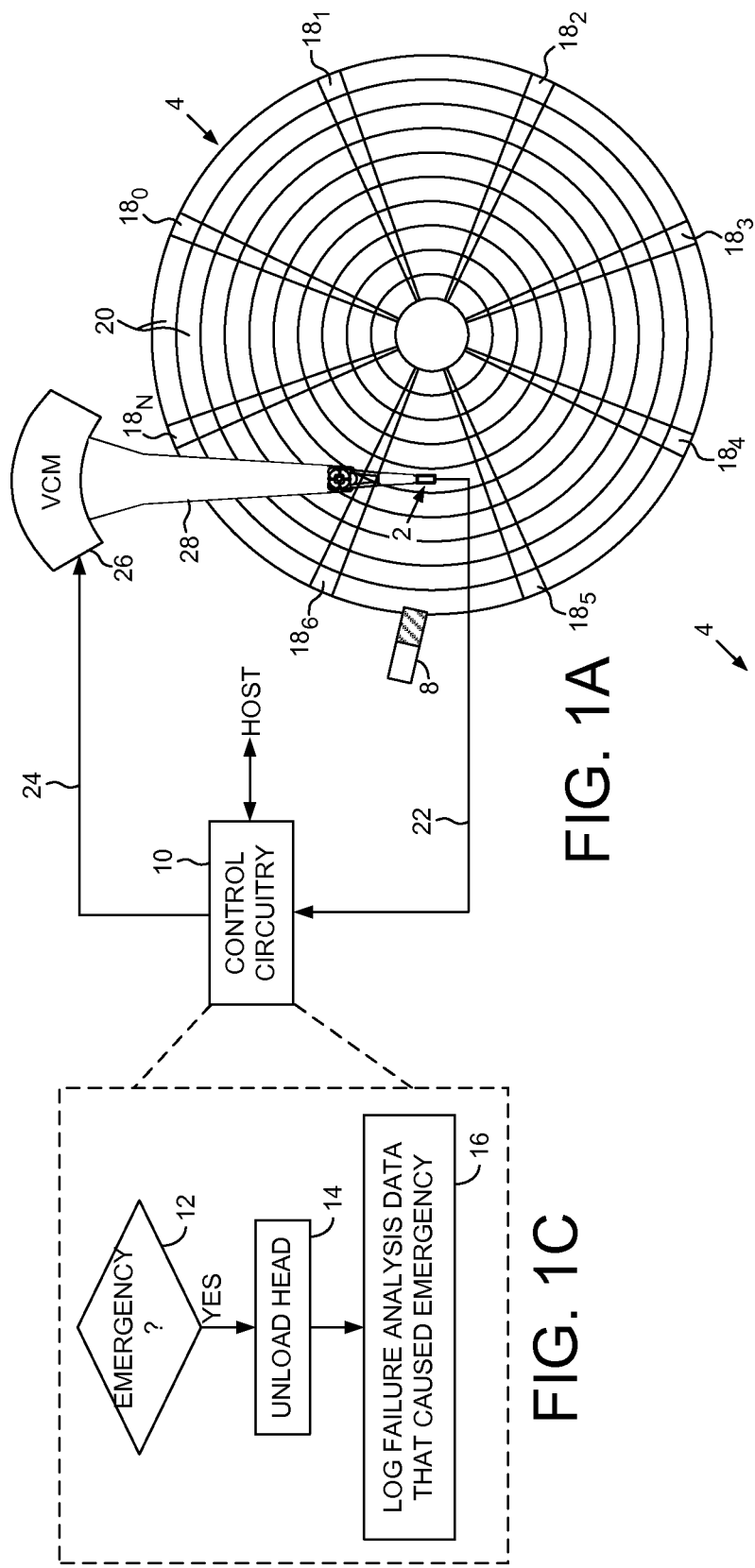
FIG. 1A shows a disk drive according to an embodiment of the present invention comprising a head actuated over a disk, and a ramp near an outer periphery of the disk.
FIG. 1B shows a spindle motor driven by a power integrated circuit (IC) according to an embodiment of the present invention.
FIG. 1C is a flow diagram according to an embodiment of the present invention wherein when an emergency condition is detected, the head is unloaded onto the ramp, and failure analysis data identifying a cause of the emergency condition is logged.

FIG. 1A shows a disk drive according to an embodiment of the present invention comprising a head 2 actuated over a disk 4, a spindle motor 6 (FIG. 1B) operable to rotate the disk 4, and a ramp 8 near an outer periphery of the disk 4. The disk drive further comprises control circuitry 10 operable to execute the flow diagram of FIG. 1C, wherein when an emergency condition is detected (block 12), the head is unloaded onto the ramp (block 14), and failure analysis data identifying a cause of the emergency condition is logged (block 16).

In the embodiment of FIG. 1A, the disk 4 comprises embedded servo sectors $18_0$-$18_N$ that define the plurality of servo tracks 20, wherein data tracks are defined relative to the servo tracks (at the same or different radial density). The control circuitry 10 processes a read signal 22 emanating from the head 2 to demodulate the servo sectors $18_0$-$18_N$ into an estimated position. The estimated position is subtracted from a reference position to generate a position error signal (PES) representing an error between the actual position of the head and a target position relative to a target track. The PES is filtered using a suitable compensation filter to generate a control signal 24 applied to a voice coil motor (VCM) 26 which rotates an actuator arm 28 about a pivot in order to actuate the head 2 radially over the disk 4 in a direction that reduces the PES. The servo sectors $18_0$-$18_N$ may comprise any suitable position information, such as a track address for coarse positioning and servo bursts for fine positioning. The servo bursts may comprise any suitable pattern, such as an amplitude-based servo pattern (e.g., a quadrature servo pattern), or a suitable phase-based servo pattern.

When an emergency condition is detected, the control circuitry 10 may seek the head 2 to the outer diameter of the disk 4 using a position controlled servo system in response to the servo sectors $18_0$-$18_N$, and then move the head 2 onto the ramp 8 using a velocity controlled servo system. In another embodiment, the control circuitry 10 may perform the entire unload operation using a velocity controlled servo system without reading the position information in the servo sectors $18_0$-$18_N$. In either case, failure analysis data identifying a cause of the emergency condition that caused the emergency unload is logged. In this manner, the failure analysis data can be recovered and evaluated in order to identify and/or rectify design defects in the disk drive.

Any suitable failure analysis data associated with an emergency unload operation may be logged in the embodiments of the present invention. For example, in one embodiment an emergency unload operation may be performed if the speed of the spindle motor 6 falls below a threshold, and therefore the failure analysis data may comprise data associated with the spindle speed fault condition. In the embodiment shown in FIG. 1B, the disk drive may comprise a power integrated circuit (IC) 30 operable to generate driving signals 32 applied to the spindle motor 6, and speed detection circuitry operable to detect the speed of the spindle motor 6.

Figure 2:
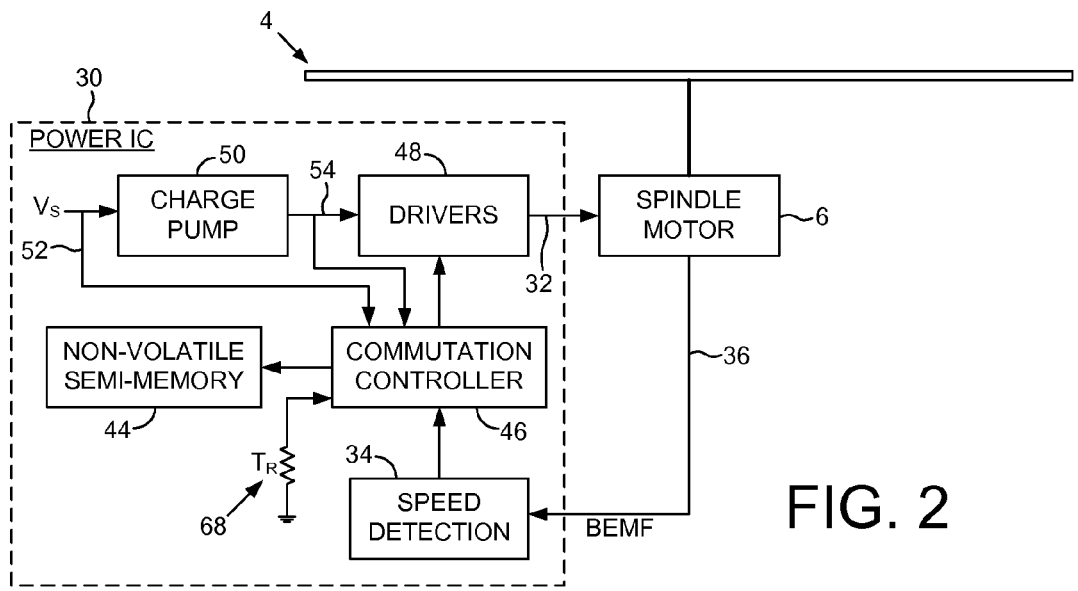
FIG. 2 shows a power IC according to an embodiment of the present invention comprising a charge pump, speed detection circuitry, a temperature sensor, and a non-volatile semiconductor memory for storing failure analysis data.
Figure 3:
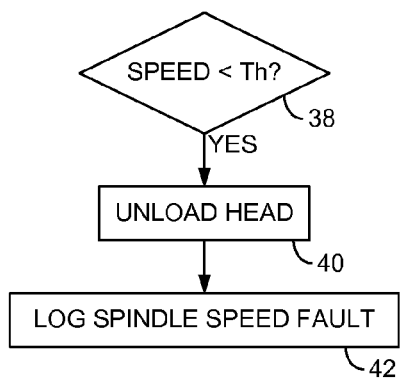
FIG. 3 is a flow diagram according to an embodiment of the present invention wherein the failure analysis data comprises a speed fault of the spindle motor.

FIG. 2 shows details of a power IC 30 according to an embodiment of the present invention comprising suitable speed detection circuitry 34 operable to detect the speed of the spindle motor 6 in response to a back electromotive force (BEMF) voltage 36 generated by the spindle motor 6. For example, the speed detection circuitry 34 may detect the speed of the spindle motor by evaluating a frequency of zero-crossings in the BEMF voltage 36. FIG. 3 shows a flow diagram according to an embodiment of the present invention wherein when the detected speed of the spindle motor falls below a threshold (block 38), the head is unloaded onto the ramp (block 40) and failure analysis data associated with the spindle speed fault is logged (block 42).

In the embodiment of FIG. 2, the power IC 30 comprises a suitable non-volatile semiconductor memory NVSM 44 (e.g., an EEPROM or FLASH) operable to log the failure analysis data (e.g., spindle speed fault) associated with the emergency unload operation. A commutation controller 46 is operable to generate the commutation control signals applied to drivers 48 that generate the driving signals 32 applied to the windings of the spindle motor 6. The commutation controller 46 also evaluates various signals representing operating conditions (such as the speed of the spindle motor) and logs the failure analysis data in the NVSM 44 when an emergency unload operation is executed.

Figure 4:
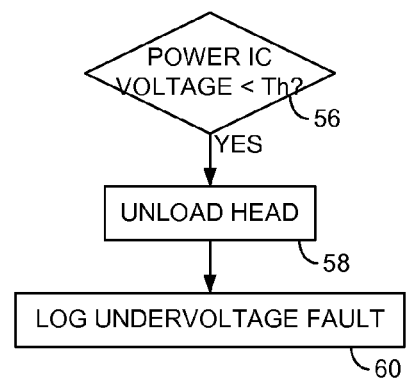
FIG. 4 is a flow diagram according to an embodiment of the present invention wherein the failure analysis data comprises an undervoltage fault of the power IC.
Figure 5:
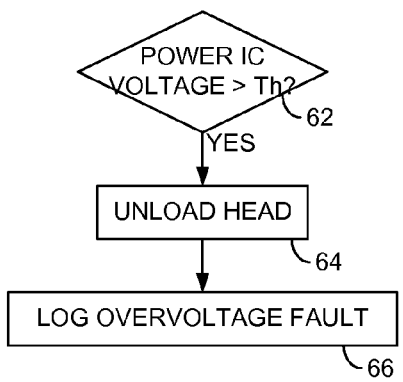
FIG. 5 is a flow diagram according to an embodiment of the present invention wherein the failure analysis data comprises an overvoltage fault of the power IC.

In one embodiment, the power IC 30 in FIG. 2 comprises a voltage regulator comprising a charge pump 50 that amplifies a supply voltage 52 into a power voltage 54 applied to the spindle motor drivers 48. FIG. 4 is a flow diagram according to an embodiment of the present invention wherein when a voltage of the power IC 30 (e.g., the supply voltage 52 or the power voltage 54 generated by the charge pump 50) falls below a threshold (block 56), the emergency unload is executed (block 58) and failure analysis data associated with the undervoltage fault is logged (block 60). FIG. 5 is a flow diagram according to an embodiment of the present invention wherein when a voltage of the power IC 30 (e.g., the supply voltage 52 or the power voltage 54 generated by the charge pump 50) exceeds a threshold (block 62), the emergency unload is executed (block 64) and failure analysis data associated with the overvoltage fault is logged (block 66).

Figure 6:
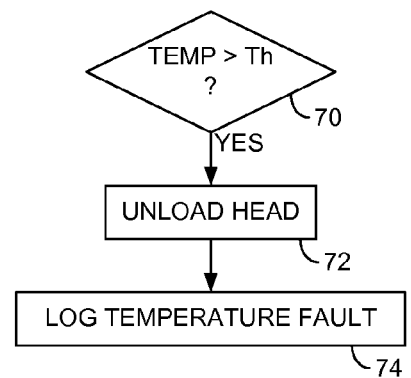
FIG. 6 is a flow diagram according to an embodiment of the present invention wherein the failure analysis data comprises a temperature fault of the power IC.

FIG. 2 also illustrates an embodiment of the present invention wherein the power IC 30 may comprise a temperature sensor (e.g., a resistor or thermistor 68) operable to measure a die temperature of the power IC 30. FIG. 6 is a flow diagram according to an embodiment of the present invention wherein when the die temperature exceeds a threshold (block 70), the emergency unload is executed (block 72) and failure analysis data associated with the temperature fault is logged (block 74).

In one embodiment, the failure analysis data stored in the NVSM 44 of the power IC 30 may be recoverable by a host system issuing an access command to the disk drive. For example, a faulty disk drive may be returned to a manufacturer or evaluated by the manufacturer over the Internet, wherein the failure analysis data may be recovered from the NVSM 44 by issuing a suitable access command to the disk drive over a host interface. Alternatively, the NVSM 44 may be physically removed from a faulty disk drive and evaluated by a manufacturer in order to recover the failure analysis data. For example, an emergency condition that causes an emergency unload may also damage the control circuitry 10 to an extent it becomes inaccessible by a host. However, the NVSM 44 may still be intact and therefore the failure analysis data still recoverable using suitable external control circuitry.

Any suitable control circuitry may be employed to implement the flow diagrams in the embodiments of the present invention, such as any suitable integrated circuit or circuits. For example, the control circuitry may be implemented within a read channel integrated circuit, or in a component separate from the read channel, such as a disk controller, or certain operations described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into a SOC.

In one embodiment, the control circuitry comprises a microprocessor executing instructions, the instructions being operable to cause the microprocessor to perform the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

What is claimed is:

1. A disk drive comprising:
   a disk;
   a head actuated over the disk;
   a spindle motor operable to rotate the disk;
   a ramp near an outer periphery of the disk;
   control circuitry operable to:
      detect an emergency condition;
      unload the head onto the ramp in response to the detected emergency condition; and
      log failure analysis data identifying a cause of the emergency condition,
   wherein the emergency condition comprises a speed of the spindle motor falling below a threshold.

2. The disk drive as recited in claim 1, wherein the failure analysis data comprises a speed of the spindle motor.

3. A method of operating a disk drive, the disk drive comprising a disk, a head actuated over the disk, a spindle motor operable to rotate the disk, and a ramp near an outer periphery of the disk, the method comprising:
   detecting an emergency condition;
   unloading the head onto the ramp in response to the detected emergency condition; and
   logging failure analysis data identifying a cause of the emergency condition,
   wherein the emergency condition comprises a speed of the spindle motor falling below a threshold.

4. The method as recited in claim 3, wherein the failure analysis data comprises a speed of the spindle motor.

5. A disk drive comprising:
   a disk;
   a head actuated over the disk;
   a spindle motor operable to rotate the disk;
   a ramp near an outer periphery of the disk;
   control circuitry operable to:
      detect an emergency condition;
      unload the head onto the ramp in response to the detected emergency condition; and
      log failure analysis data identifying a cause of the emergency condition,
   wherein:
      the control circuitry comprises a power integrated circuit comprising power circuitry operable to generate driving signals applied to the spindle motor; and
      the emergency condition comprises at least one of an undervoltage condition and an overvoltage condition of the power integrated circuit.

6. The disk drive as recited in claim 5, wherein:
the power integrated circuit receives a supply voltage; and
the undervoltage condition comprises an undervoltage of the supply voltage.

7. The disk drive as recited in claim 5, wherein:
the power integrated circuit comprises a voltage regulator comprising a charge pump; and
the undervoltage condition comprises an undervoltage of an output of the charge pump.

8. A disk drive comprising:
   a disk;
   a head actuated over the disk;
   a spindle motor operable to rotate the disk;
   a ramp near an outer periphery of the disk;
   control circuitry operable to:
      detect an emergency condition;
      unload the head onto the ramp in response to the detected emergency condition; and
      log failure analysis data identifying a cause of the emergency condition,
   wherein:
      the control circuitry comprises a power integrated circuit comprising power circuitry operable to generate driving signals applied to the spindle motor; and
      the emergency condition comprises a die temperature of the power integrated circuit exceeding a threshold.

9. The disk drive as recited in claim 8, wherein the power integrated circuit comprises a resistor fabricated on a die operable to detect the die temperature.

10. A method of operating a disk drive, the disk drive comprising a disk, a head actuated over the disk, a spindle motor operable to rotate the disk, and a ramp near an outer periphery of the disk, the method comprising:
   detecting an emergency condition;
   unloading the head onto the ramp in response to the detected emergency condition; and
   logging failure analysis data identifying a cause of the emergency condition,
wherein:
   the disk drive comprises a power integrated circuit comprising power circuitry operable to generate driving signals applied to the spindle motor; and
   the emergency condition comprises at least one of an undervoltage condition and an overvoltage condition of the power integrated circuit.

11. The method as recited in claim 10, wherein:
   the power integrated circuit receives a supply voltage; and
   the undervoltage condition comprises an undervoltage of the supply voltage.

12. The method as recited in claim 10, wherein:
   the power integrated circuit comprises a voltage regulator comprising a charge pump; and
   the undervoltage condition comprises an undervoltage of an output of the charge pump.

13. A method of operating a disk drive, the disk drive comprising a disk, a head actuated over the disk, a spindle motor operable to rotate the disk, and a ramp near an outer periphery of the disk, the method comprising:
   detecting an emergency condition;
   unloading the head onto the ramp in response to the detected emergency condition; and
   logging failure analysis data identifying a cause of the emergency condition,
wherein:
   the disk drive comprises a power integrated circuit comprising power circuitry operable to generate driving signals applied to the spindle motor; and
   the emergency condition comprises a die temperature of the power integrated circuit exceeding a threshold.

14. The method as recited in claim 13, wherein the power integrated circuit comprises a resistor fabricated on a die operable to detect the die temperature.

* * * * *